United States Patent [19]

Deutsch et al.

[11] Patent Number: 4,630,148

[45] Date of Patent: Dec. 16, 1986

[54] MAGNETIC-TAPE-CASSETTE APPARATUS WITH IMPROVED FUNCTION SWITCHING MECHANISM

[75] Inventors: Armin Deutsch; Henricus M. Ruyten, both of Wetzlar, Fed. Rep. of Germany

[73] Assignee: U.S. Philips Corporation, New York, N.Y.

[21] Appl. No.: 593,800

[22] Filed: Mar. 27, 1984

[30] Foreign Application Priority Data

Apr. 2, 1983 [DE] Fed. Rep. of Germany ....... 3312135
Apr. 11, 1983 [NL] Netherlands .................. 8301266

[51] Int. Cl.⁴ .................. G11B 15/44; G11B 15/02
[52] U.S. Cl. .................. 360/93; 242/191; 360/74.1; 360/137
[58] Field of Search .......... 360/105, 90, 93, 96.1–96.4, 360/73, 74.1, 74.3, 137; 242/191, 197–201

[56] References Cited

U.S. PATENT DOCUMENTS

| | | | |
|---|---|---|---|
| 4,159,492 | 6/1979 | Ban et al. | 360/74.3 |
| 4,329,720 | 5/1982 | Kodama | 360/74.3 |
| 4,495,532 | 1/1985 | Kurafuzi et al. | 360/74.1 |
| 4,520,412 | 5/1985 | Yoshida | 360/96.1 |

FOREIGN PATENT DOCUMENTS 2524219 12/1976 Fed. Rep. of Germany.

Primary Examiner—John H. Wolff
Assistant Examiner—David J. Severin
Attorney, Agent, or Firm—David R. Treacy

[57] ABSTRACT

A mechanism for switching from one operating function to another upon stoppage of tape movement, including a switching wheel which is driven continuously during operation and actuates a switching member, and a connecting member which moves in the same given direction for releasing a cassette and for reversing a direction of tape travel. A tape stoppage detection means controls the position of the switching member with respect to the switching wheel. The connecting member is latched in a position corresponding to movement of the head mounting plate toward the cassette, and is unlatched either by the switching member upon tape stoppage, or depression of a stop button to permit the head mounting plate to return to a withdrawn position away from the cassette.

12 Claims, 12 Drawing Figures

MAGNETIC-TAPE-CASSETTE APPARATUS WITH IMPROVED FUNCTION SWITCHING MECHANISM

BACKGROUND OF THE INVENTION

The invention relates to a function control mechanism for a magnetic-tape-cassette apparatus for switching from one operating function to another, and more particularly to such an apparatus which comprises a head-mounting plate which can be moved towards the cassette, and a switching mechanism which comprises a switching wheel which is driven continuously during operation of the apparatus and which actuates a switching member, a detection means, which is coupled to at least one winding spindle and which controls the position of the switching member on the switching wheel during tape transport, a guideway on the switching wheel, which actuates the switching member during tape stoppage, and a connecting member which is always moved in the same direction by the switching member for switching the apparatus to another operating function.

Such a switching device is disclosed in German offenlegungsschrift No. 25 24 219. In this device the switching mechanism actuates a connecting member in the form of a latching slide, the switching member. The connecting member only serves to release the push-button mechanism of the apparatus. In this way the switching mechanism can only stop the drive mechanism when the tape is stationary, the head-mounting plate being moved away from the cassette upon release of the push button. However, upon switching on the switching mechanism is not capable of moving the head-mounting plate towards the cassette and thereby putting the apparatus into operation again.

SUMMARY OF THE INVENTION

It is the object of the invention to provide a switching device which enables the apparatus to be switched off and to be switched on via the switching member and the connecting member without the use of intricate servomechanisms, all the switching operations being initiated by a switching wheel which is continuously driven in one direction during operation.

According to the invention this is achieved in that the connecting member can be coupled to the head-mounting plate for positioning the head-mounting plate, a latching mechanism latches the head-mounting plate in a position in which it has been moved towards the cassette, the connecting member releases the latched latching mechanism when said member is actuated again under control of the switching member and as a result of the release moves the head-mounting plate away from the cassette towards a withdrawn position.

The use of the latching mechanism enables the switching-on and switching-off functions always to be performed in the same way by movement of the connecting member by the switching member always in the same direction. Since the connecting member provides the movement of the head-mounting plate, both towards the cassette and away from the cassette, switching on as well as switching off is easily obtained using one simple control mechanism.

In a further embodiment of the invention the connecting member cooperates with the head-mounting plate through a spring means in such a way that when the connecting member is moved again, it is moved further in a continuous movement from the latched position in the direction which had moved the head-mounting plate to a position near the cassette, during which prior movement the latching mechanism had become latched. Owing to the provision of the elastic coupling between the connecting member and the head-mounting plate the connecting member, which acts in one direction only while activating the other parts, can perform an overtravel which is necessary to allow releasing the latching mechanism without being impeded by the head-mounting plate.

In another embodiment of the invention the latching mechanism comprises a heart-shaped projection, a guide situated opposite the heart-shaped recess in the heart-shaped projection, and a first pin which moves past the heart-shaped projection. The heart-shaped projection and the guide are arranged on the connecting member and the first pin is pivotally connected to the frame in such a manner that the pin can move past the heart-shaped projection and can also be pivoted out of the area of engagement with the heart-shaped projection. This results in a latching mechanism which can be rendered inoperative in an effective manner, for example when the apparatus is rendered inoperative, and which can readily be actuated, for example by inserting a magnetic-tape-cassette into the apparatus.

In a further embodiment of the invention the latching lever is pivotally arranged on the frame and carries a second pin which extends in a guide slot formed in an actuating rod connected to a stop button, the latching lever being pivoted by a movement of the actuating rod so as to move the first pin out of the area of engagement with the heart-shaped projection. In this way the latching mechanism is always rendered inoperative automatically when the stop button and the actuating rod connected thereto is pressed inwards. This actuating rod may have a combined function when it is also used for the ejection of the cassette.

In another embodiment of the invention an electrical on/off switch for the circuit of a drive motor of the apparatus is guided on the frame so as to be movable against spring force, the actuating rod and the head-mounting plate are provided with switching limbs which urge the contacts of the switch apart to open the circuit when the actuating rod is moved inwards relative to the apparatus or when the head-mounting plate is moved from the position near the cassette towards the withdrawn position, the actuating rod carries a projection which, when the rod is moved inwards, moves the switch towards a shifted position in which the contacts of the switch are situated outside the area in which they can be actuated by the switching limb of the head-mounting plate, and the head-mounting plate carries a projection which, in a shifted position of the switch and in a withdrawn position of the head-mounting plate, retains the switch in the shifted position until the head-mounting plate is again moved towards the cassette.

In this way the contacts of the switch can be closed when a cassette is inserted into the apparatus and the head-mounting plate is still withdrawn, to start the drive mechanism so that the switching mechanism can be actuated and the head-mounting plate can be moved towards the cassette.

In yet another embodiment of the invention the actuating rod of at least one fast-wind button can be coupled to the contacts of the switch, so that by depression of the fast-wind button the contacts are closed, the drive motor is started and the connecting member is actuated again to move the cassette towards the head-mounting plate. Thus, by the brief depression of the fast-wind button the switching mechanism can be reactivated, when the cassette has already been inserted.

Embodiments of the invention will be described in more detail, by way of example, with reference to the drawings.

DESCRIPTION OF THE PREFERRED EMBODIMENTS

Figure 1:
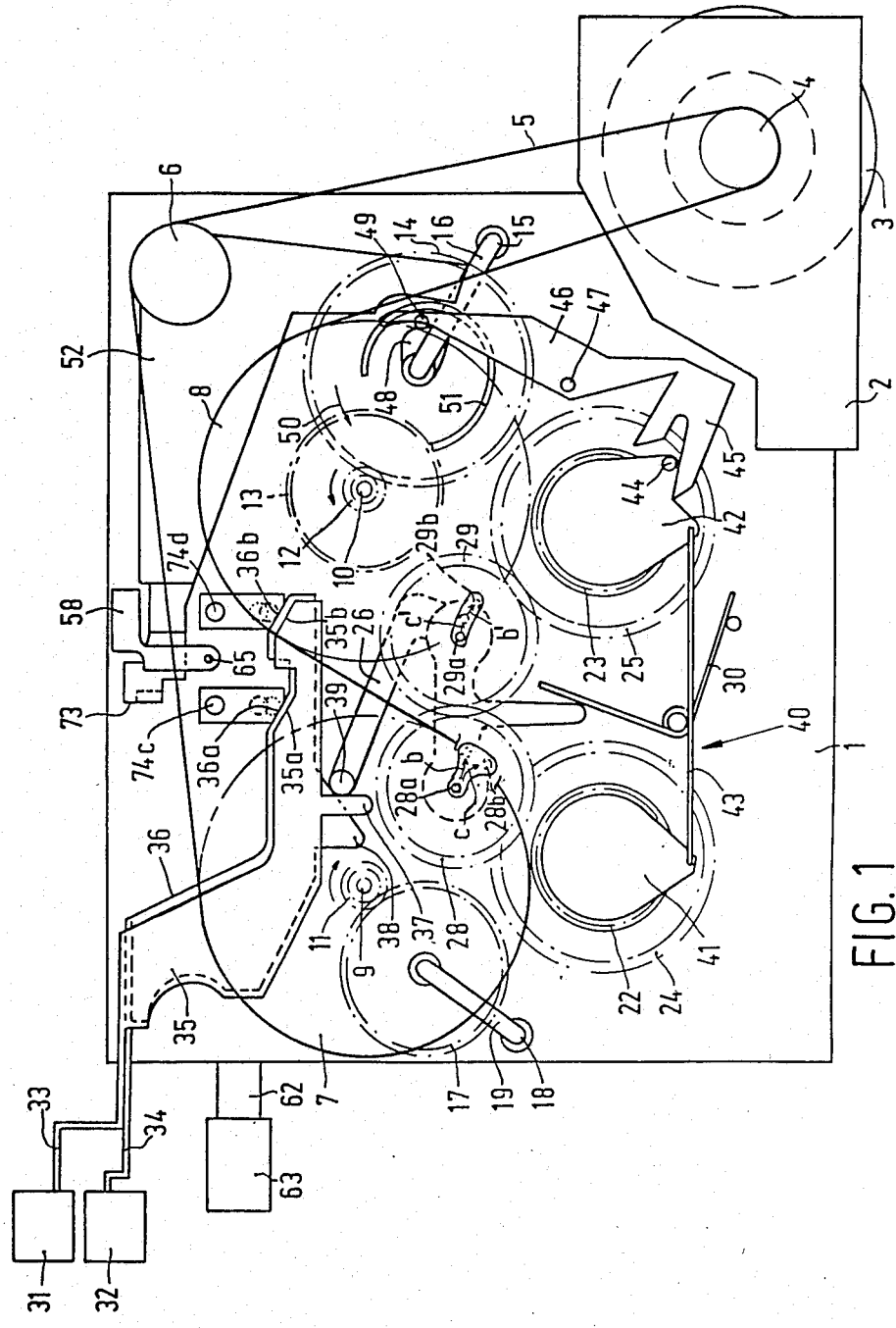
FIG. 1 is a view of the driving side of a magnetic-tape-cassette apparatus in accordance with the invention in a first embodiment.

The magnetic-tape-cassette apparatus in accordance with the invention, as shown in FIG. 1, comprises a frame 1 which carries a non-reversible drive motor 3 on a support 2. The drive wheel 4 of the motor 3 guides a belt 5, which is passed along flywheels 7 and 8 over a guide roller 6 in such a way that the flywheels rotate in opposite direction. The flywheels 7 and 8 are rotatably journalled in the frame 1. The flywheel 7 is rigidly connected to a capstan 9 and the flywheel 8 is rigidly connected to a capstan 10. Moreover, the flywheel 7 is connected to a gear wheel 11 and the flywheel 8 is connected to a gear wheel 12. A further gear wheel 13 is arranged parallel to the gear wheel 12 so as to be rotatable relative to the flywheel 8 through a slipping clutch. A switching wheel 14 in the form of a gear wheel is constantly in mesh with the gear wheel 12 on the flywheel 8. This gear wheel 14 is arranged to be pivotable about a spindle 15. The spindle 15 carries a pivotal arm 16, shown schematically in FIG. 1, on which the switching wheel 14 is mounted for rotation. In a similar way a gear wheel 17 is constantly in mesh with the gear wheel 11. This gear wheel 17 is arranged to be pivotable about a spindle 18 by means of a pivotal arm 19, which is shown schematically.

Figure 3:
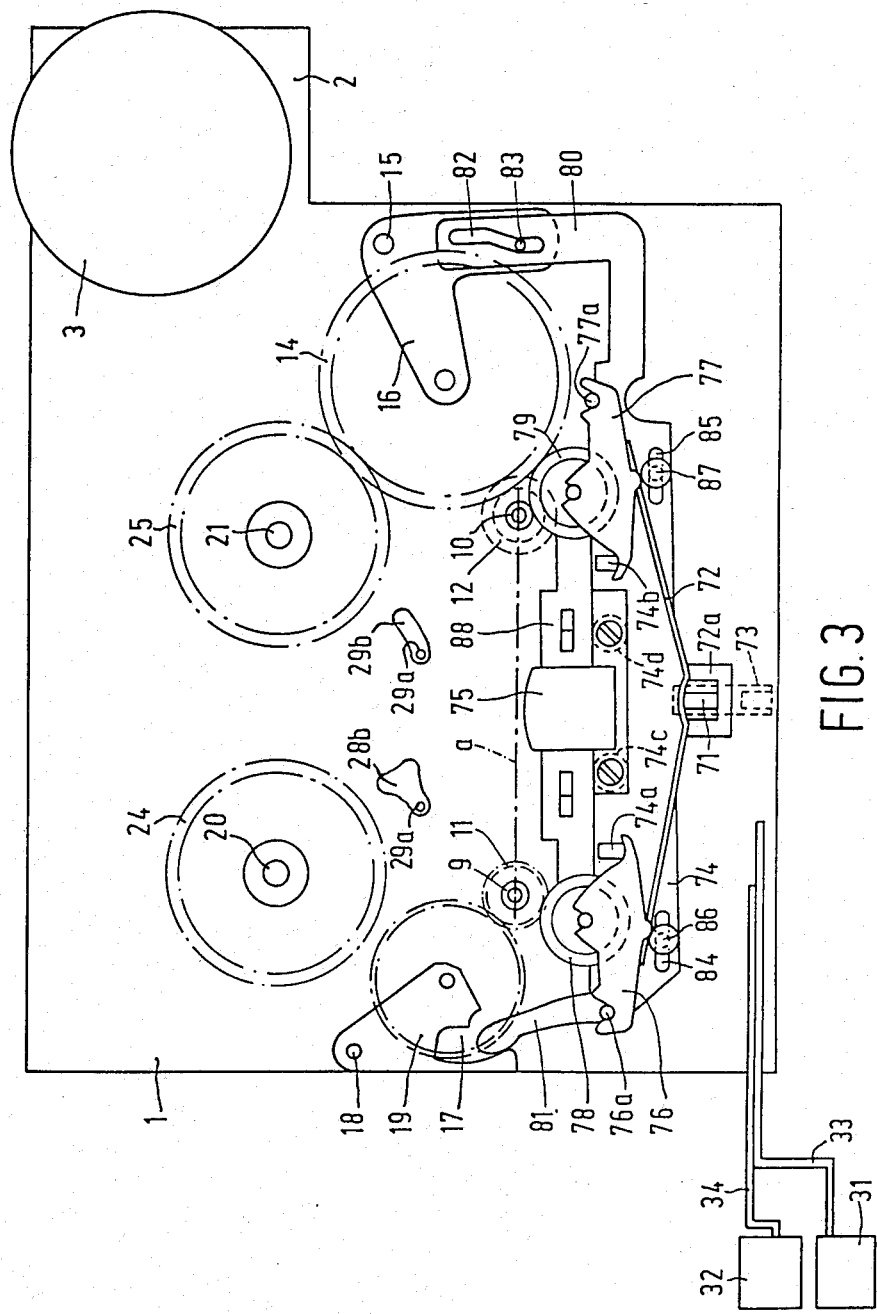
FIG. 3 is a view of the magnetic-head side of the magnetic-tape-cassette apparatus in a first tape-transport direction.
Figure 4:
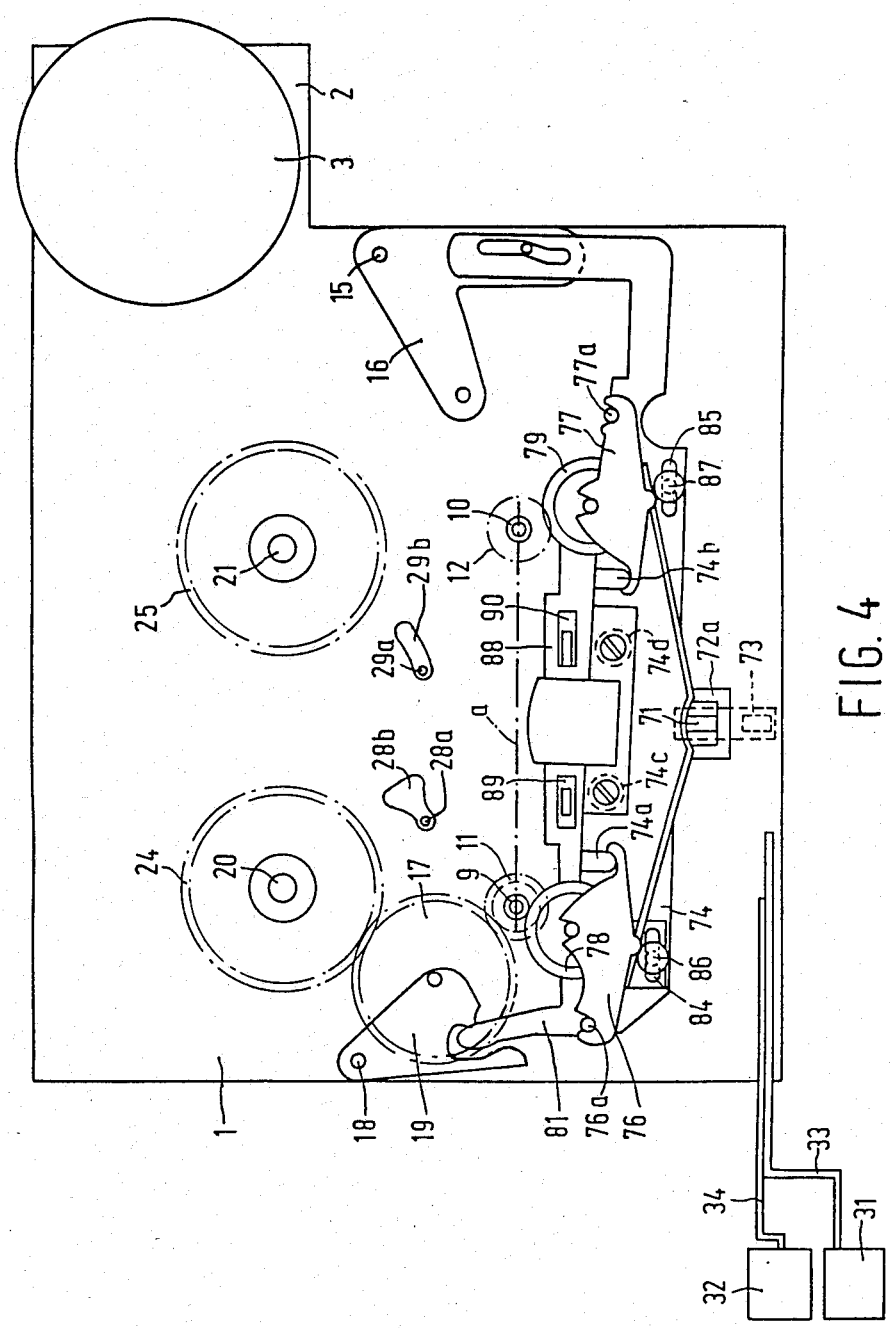
FIG. 4 is a view of the magnetic-tape-cassette apparatus similar to that in FIG. 3, but in a second, opposite tape-transport direction.

As is also shown in FIGS. 3 and 4, winding spindles 20 and 21 are rotatably journalled in the frame 1. These winding spindles 20 and 21 are rigidly connected to fastwind wheels 22, 23. Play wheels 24, 25 are coupled to the winding spindles 20, 21 by slipping clutches.

FIG. 3 shows how the play wheel 25 is driven by the gear wheel 12 through the switching wheel 14. In a similar way FIG. 4 shows how the play wheel 24 is driven by the gear wheel 11 through the gear wheel 17.

A member 26, which is movably guided in the frame 1, carries two gear wheels 28, 29 adjacent each other. A spring 30 pushes the member 26 towards the initial position shown in FIG. 1. The member 26 carries pins 28a, 29a, which are movably guided in a triangular hole 28b and a slot 29b, respectively, in the frame 1.

For fast forward and reverse winding there are provided two buttons 31 and 32. These buttons 31, 32 are connected to slides 35, 36 through the actuating or push-button rods 33 and 34. These slides 35, 36 cooperate with the member 26. For this purpose the slide 35 is formed with a projection 37 and the slide 36 is formed with a guide surface 38. The projection 37 and the guide surface 38 cooperate with a pin 39 on the member 26. The slides 35, 36 further comprise guide surfaces 35a, 35b and 36a, 36b, respectively, which can operate on pins 74c, 74d of a head plate 74 (see also FIGS. 3, 4).

When as a result of the depression of the button 31 the projection 37 is urged against the pin 39 on the member 26, the gear wheel 29 first comes into mesh with the gear wheel 13. The pins 28a and 29a then move in the hole 28b and the slot 29b, respectively, in the direction indicated by the arrows b and c' respectively. As the movement continues, the pin 29a moves further in the slot 29b in the direction indicated by the arrow b', as a result of which the gear wheel 29 also meshes with the fast-wind wheel 23. The winding spindle 21 is now driven with a higher speed and the magnetic tape is wound rapidly.

If the other fast-wind button 32 is depressed the guide surface 38 slides past the pin 39. The pins 28a and 29a then move in the directions indicated by the arrows c and c' respectively, so that the gear wheel 29 meshes with the gear wheel 13 and the gear wheel 28 meshes with the gear wheel 22. In this way the other winding spindle 20 is now driven for fast winding. When the head mounting plate 74 has reached a playing position, the pins 74c, 74d assume one of the broken-line-positions shown in FIG. 1. The positions correspond to the positions shown in FIGS. 3 and 4, respectively. Actuating the pushbutton rods 33 and 34, respectively, causes the pins 74c, 74d and hence the head-mounting plate 74 to be moved to the left by engagement with the guide surfaces 35a, 35b and 36a, 36b, respectively, so that an audio head 75 and pressure rollers 78–79 are lifted from the magnetic tape.

A detection means 40, comprising two discs 41, 42 and a connecting rod 43, is connected to the winding spindles 20, 21 through slipping clutches. A pin 44 arranged on the disc 42 engages a switching fork 45. The switching fork 45 is arranged on a switching member 46, which is pivotable about a pivot 47 (see also FIGS. 2A and 2B). The switching wheel 14 carries a central slightly elliptical projection 48. The switching member 46 extends over the switching wheel 14 and carries a pin 49, which, when the switching member 46 has pivoted inwards slides over the circumference of the projection 48 when the switching wheel is rotated in the direction indicated by an arrow 50. Around the projection 48 a spiral guide wall 51 is formed on the switching wheel 14 at a comparatively large distance. This guide wall 51 can also cooperate with the pin 49 on the switching member 46, namely when the detection means detects tape stoppage. After detection of tape stoppage, the pin 44 no longer pushes against the switching fork 45, so that the pin 49 on the switching member 46 is no longer moved inwards towards the projection 48 but remains in the same position and, as the switching wheel 14 continues to rotate in the direction indicated by the arrow 50, reaches the outer side of the guide wall 51. Since the guide wall 51 is spiral-shaped the switching member 46 will be pivoted clockwise about the pivot 47, so that the switching member 46 is urged against a connecting member 52.

Figure 2A:
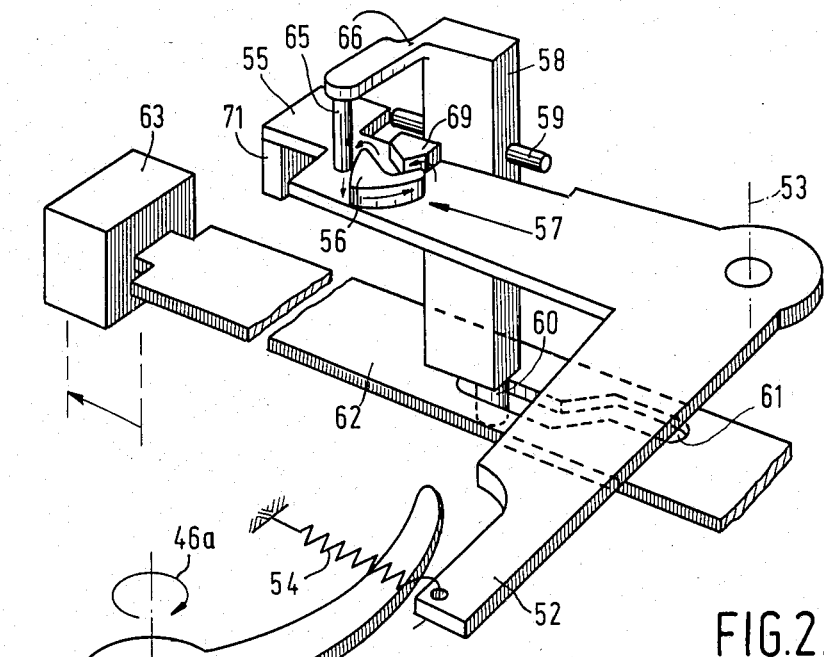
FIG. 2a is an enlarged perspective view of a latching mechanism of the apparatus in the first position.
Figure 2B:
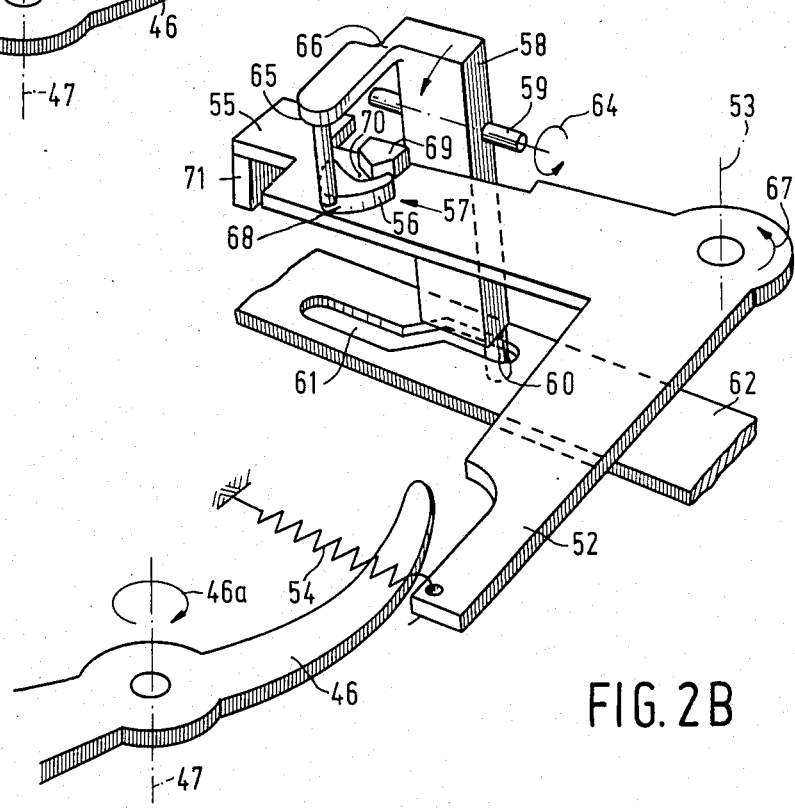
FIG. 2b shows the latching mechanism of FIG. 2a in a second position.

The connecting member 52 is a lever having two arms, pivotable about a pivot 53. As can be seen in FIGS. 2A and 2B, the connecting member 52 is spring-biased in the clockwise direction by a spring 54. Thus, the movement of the switching member 46 tensions the spring 54.

The lever arm 55 of the connecting member 52, which arm is remote from the point of engagement with the switching member 46, carries a heart-shaped projection 56 which forms part of a latching mechanism 57. The latching mechanism 57 also comprises a latching lever 58, which can be pivoted relative to the frame about a spindle 59. The spindle 59 extends parallel to the upper surface of the frame 1 and to an imaginary connecting line a between the capstans 9 and 10. The latching lever 58 carries a guide pin 60 on its side which faces the heart-shaped projection 56, the pin extending through a guide slot 61 in an actuating rod 62 of a stop-/eject button 63. The guide slot 61 has such a shape that the latching lever 58, as can be seen in FIG. 2B, is pivoted about the spindle 59 in the direction indicated by an arrow 64 when the stop/eject button is released. The outward movement of the stop/eject button 63 and the rod 62 is obtained in a manner, not shown, by inserting a magentic-tape cassette into the apparatus. FIG. 2A shows the rod 62 in the inward position and FIG. 2B shows the rod 62 in the outward position.

The latching lever 58 carries a latching pin 65, which can engage with and pass around the heart-shaped projection 56. This movement is made possible by means of, for example, an integral hinge 66. In FIG. 2A the pin 65 is pivoted out of the area where it can engage with the heart-shaped projection 56, because the rod 62 is in the depressed position (button 63 pushed in). In FIG. 2B, in which the actuating rod 62 has moved to another position, the pin 65 is positioned in the area where it can engage with the heart-shaped projection 56. The pin 65 can then cooperate with the heart-shaped projection 56 when the switching member 46 pivots the connecting member 52 in the counterclockwise direction indicated by an arrow 67, as shown in FIG. 2B. During this pivotal movement the pin 65 moves past a side wall 68 of the heart-shaped projection 56. A guide 69 ensures that the pin 65 engages with a recess 70 in the heart-shaped projection 56.

The lever arm 55 also carries a limb 71. As can be seen in FIGS. 3 and 4, this limb 71 cooperates with a spring means formed by a blade spring 72, and is guided in a slot 73 in a frame 1. With its free ends the blade spring 72 acts against members 76 and 77 which are pivotally journalled in the head-mounting plate 74. In its center this head-mounting plate 74 carries an audio magnetic head 75. One of the members 76, 77 in which the pressure rollers 78, 79 are journalled, is mounted to the plate 74 to each side of the audio head 75. The members are urged against stops 74a and 74b on the head-mounting plate 74 by the spring force of the blade spring 72.

The head-mounting plate 74 has angular end-portions 80, 81. The end portion 80 is formed with a slot 82, in which a pin 83 on the pivotal arm 16 is movable. Thus, in the position shown in FIG. 3, the pivotal arm 16 has pivoted about the spindle 15 in such a manner that the switching wheel is in mesh with the play wheel 25 and the gear wheel 12. In a similar way FIG. 4 shows that the end portion 81 of the head mounting plate 74 has pivoted the pivotal arm 19 about the spindle 18, so that the gear wheel 17 is in mesh with the play wheel 24 and the gear wheel 11. Moreover, in the position shown in FIG. 3 the pressure roller 79 is urged against the capstan 10 and in the position shown in FIG. 4 the pressure roller 78 is urged against the capstan 9.

Guide Pins and Control Plate

In the head-mounting plate 74 slots 84, 85 are formed. These slots extend parallel to the connecting line between the capstans 9, 10, guide pins 86, 87 being movable in these slots.

Figure 5:
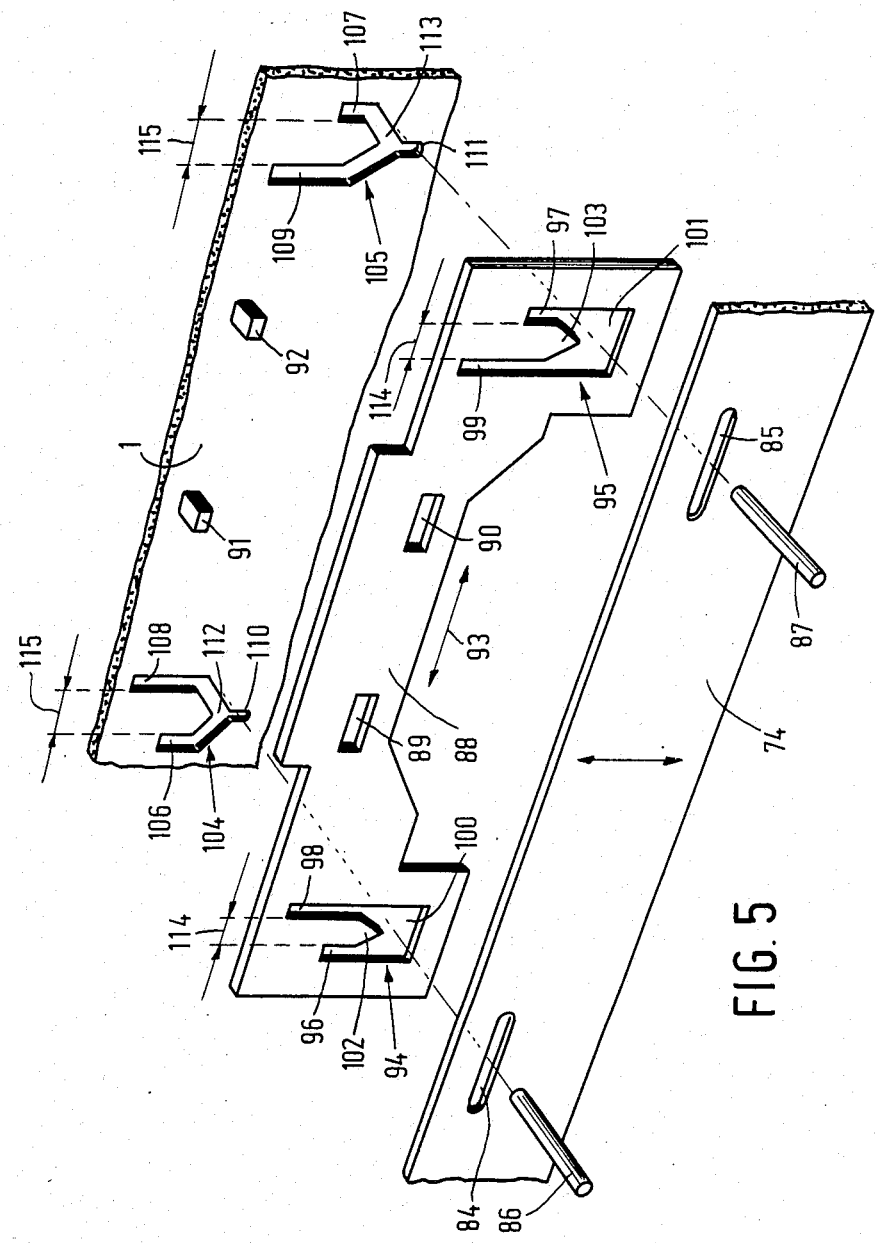
FIG. 5 is an exploded view which shows how a guide-slot system cooperates with a control means and a head-mounting plate.
Figure 6:
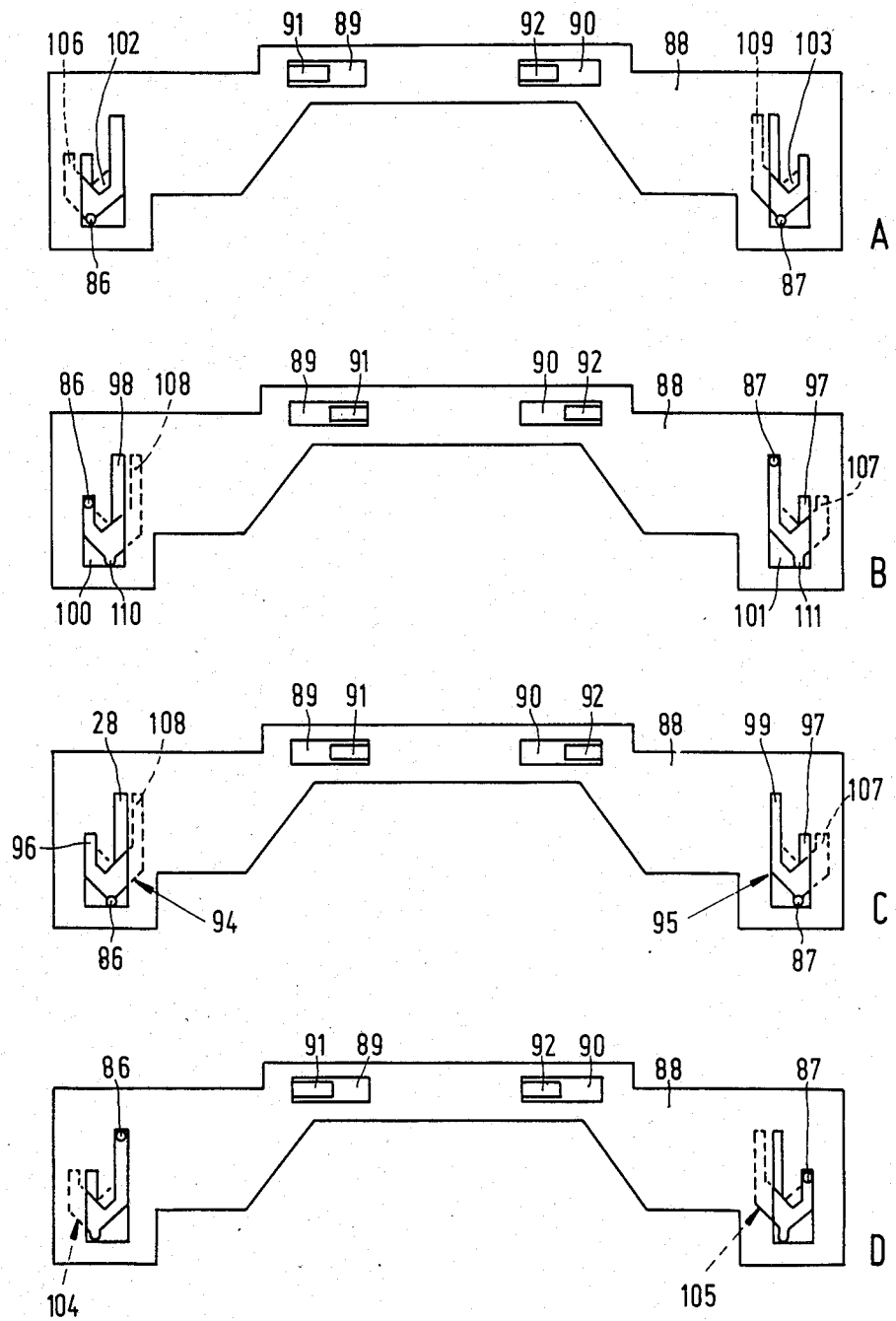
FIGS. 6A–6D show the various positions of a control plate for controlling the guide-slot system and a head-mounting plate.
Figure 8:
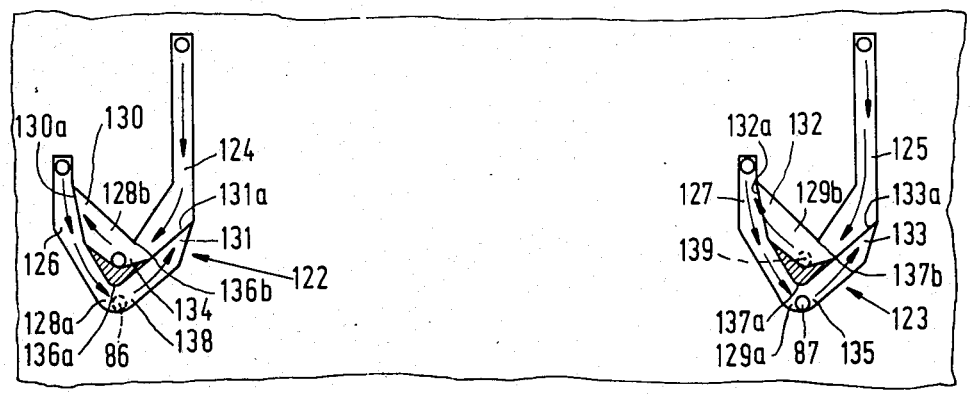
FIG. 8 shows another guide-slot system and control means for pivoting the head-mounting plate in a second embodiment of the invention.

The exploded view in FIG. 5 shows the guide pins 86, 87 which are guided in the slots 84, 85 in the head-mounting plate 74. Thus, with respect to the head-mounting plate 74, the guide pins can be moved parallel to the connecting line a between the capstans. The movement of the guide pins 86, 87 in the transverse direction, toward and away from the capstans 9, 10, will be described later with respect to operation of the apparatus as shown in FIGS. 5, 6 and 8. How the guides 86, 87 are retained in the head-mounting plate 74 is not shown. A simple construction is to secure the guide pins to a cap in the same way as the pin of a thumbtrack. However, alternatively, the guide pins may be arranged on the free ends of resilient tongues which are secured to the head-mounting plate 74.

A control plate 88, which serves as the control means, is arranged between the head-mounting plate 74 and the upper side of the frame 1. This control plate 88 is formed with longitudinal slots 89, 90 through which projecting guides 91, 92 on the chassis plate extend. As a result of this construction, the control plate 88 is movable parallel to the imaginary connecting line a (shown in FIGS. 3 and 4) between the capstans 9, 10. In FIG. 5 this movement is indicated by a double arrow 93.

On both ends the control plate 88 has U-shaped slots 94, 95 cut through the plates disposed mirror-symmetrically relative to each other. The U-shaped slots 94 and 95 each have a short branch 96, 97 and a long branch 98, 99. The short branches are remote from each other and the long branches are disposed closer to each other. The connecting portions 100 and 101 between the short and the long branches are substantially wider. Between the long and short branches tongues 102 and 103 are formed, which tongues have pointed ends which face the connecting portions 100, 101.

Fork-shaped guide slots 104 and 105, which constitute a guide-slot system and which are disposed mirror-symmetrically relative to each other, are formed in the frame 1. The slots 104, 105 each comprise two branches corresponding to fork tines, one branch 106, 107 being shorter than the other branch 108, 109. Again the short branches of the slots are remote from each other and the long branches are disposed closer to each other. A central run-in branch 110, 111 opens into the a-shaped fork base 112, 113 of the guide slots 104, 105. The distance 114 between the branches of the U-shaped guide slots 94, 95 in the control plate 88 is smaller than the distance 115 between the lateral branches of the V-shaped guide slots 104, 105.

Figure 7:
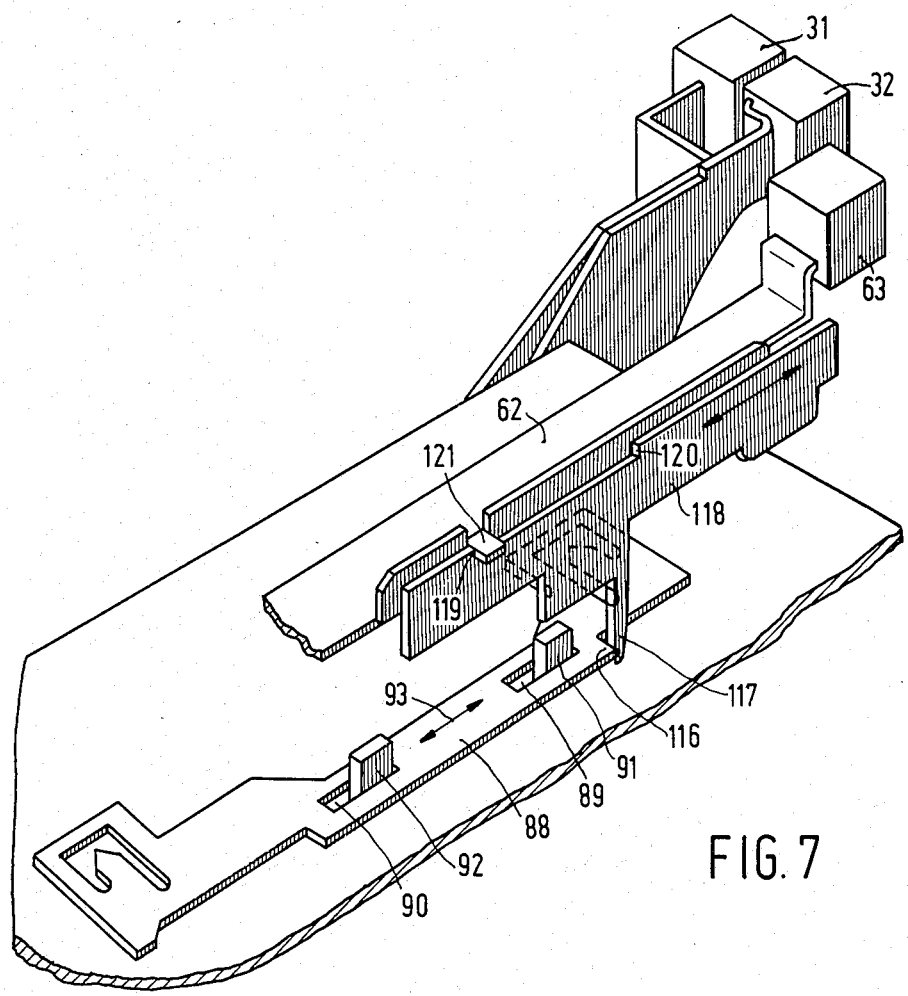
FIG. 7 is a perspective view of the control plate and a stop button which cooperates with this plate to define a preferred tape-transport direction.

FIG. 7 is a perspective view of the control plate 88. The control plate 88 is provided with a stop 116 with which a projection 117 of an intermediate slide 118 can abut. The slide 118 can be moved parallel to the imaginary connecting line a between the capstans 9 and 10. The intermediate slide 118 is provided with two stops 119, 120, against which an actuating tab 121 on the stop-button rod 62, which also serves as ejector, abut. If the stop-eject button 63 is moved outwards by the rod 62, this rod movement also moves the intermediate slide 118 outwards because the actuating tab 121 has abutted with the stop 120. As a result of this, the projection 117 moves away from the stop 116. Thus, the control plate 88 can move freely in the direction indicated by the double arrow 93 in FIGS. 5 and 7. However, when the stop/eject button 63 is depressed the actuating tab 121 abuts with the stop 119 and the projection 117 abuts the stop 116. This defines a preferred position of the control plate 88 as shown in FIG. 6B.

Operation

The device operates as follows. When a cassette is inserted the stop/eject button 63 moves from the position shown in FIG. 2A to the position shown in FIG. 2B. In a manner, not shown, the electrical switch of the motor 3 is closed and the motor is started. As a result of this, the flywheels 7 and 8 begin to rotate in opposite directions. At the same time the gear wheels 11 and 12 are rotated, so that the gear wheels 14 and 17 with which they cooperate respectively are also rotated.

As a result of the movement of the stop/eject button 62 the latching lever 58 is pivoted about the spindle 59, as shown in FIG. 2A, and the latching pin 65 is positioned in the area of engagement with the heart-shaped projection 56, as shown in FIG. 2B.

As the gear wheels 14 and 17 are not in mesh with the gear wheels 24 and 25, the two winding spindles 20 and 21 are not driven. The discs 41 and 42 are coupled to the winding spindles 20, 21 through separate slipping clutches and are therefore also stationary. Since no torque is exerted on the switching members 46 when the cassette is inserted, because the reels do not rotate and there is no tape transport, the switching member 46 remains in the position shown in FIG. 1 and the pin 49 is moved against the outer side of the guide wall 51. As a result of this, the switching member 46 is moved in a clockwise direction, as indicated by the arrow 46a, and the connecting member 52 is pivoted counterclockwise, as indicated by the arrow 67. Since the latching lever 58 has pivoted and the pin 65 is positioned in the area of engagement with the heart-shaped projection 56, the pin 65 now travels along the wall 68 of the heart-shaped projection 56 and engages the recess 70. Thus, the connecting member is latched in a pivotal position (see FIG. 2B).

Owing to the pivotal movement of the connecting member 52 in the counterclockwise direction indicated by the arrow 67, the limb 71 has moved inwards and is urged against the blade spring 72. The blade spring in its turn acts against the head-mounting plate 74 through the members 76 and 77 and tends urge this plate towards the capstans 9, 10. Now the action of the control plate 88 manifests itself.

Prior to the inward pivotal movement of the limb 71 the head-mounting plate 74 is clear of the capstans. As a result of this, the guide pins 86, 87 have engaged the run-in branches 110 and 111 (see FIG. 5). The control plate 88 has assumed the position shown in FIG. 6A. When the head-mounting plate 74 is moved towards the capstans 9, 10 the guide pins 86, 87 move in the same direction and abut with the left-hand sides of the tongues 102, 103 to run into the left-hand branches 106 and 109 of the guide slots 104, 105. The left-hand guide pin 86 is then retained in the shorter branch, while the right-hand guide pin 87 can move freely towards the capstan 10 (see FIG. 6B). As a result of this, the advanced head-mounting plate 74 swings forwards towards the right, in such a way that the right-hand pressure roller 79 is applied to the right-hand capstan 10. The other capstan remains free. Consequently, the tape runs in the direction indicated in FIG. 3.

When the end of the tape is reached the tape stops. As a result of this, the switching member 46 with the pin 49 is again pivoted in the clockwise direction and the connecting member 52 is again pivoted counterclockwise (FIG. 2B) in the direction indicated by the arrow 67. During this movement the connecting member 52 is pivoted beyond the normal travel obtained when it is in its latched position. This overtravel is possible because the limb 71 acts against the blade spring 72 on the head-mounting plate 74 and thus has room for a movement towards the head-mounting plate. During this overtravel the pin 65 leaves the recess 70 and the latching mechanism 57 is released. Under the influence of the spring 54 the released connecting member 52 is now pivoted clockwise, so that the limb 71 moves outwards. In this position the head-mounting plate moves away from the cassette and the guide pins 86, 87 again engage with the run-in branches 110, 111. The control plate 88 remains in its last position. The tongues 102 and 103 thus remain in a position which is shifted to the left relative to the center of the run-in branches 110 and 111 (FIG. 6C).

Now the reversal of the tape-transport direction begins. The switching wheel 14 continues to rotate. Since the head-mounting plate 74 has moved away from the cassette and the capstans 9, 10, its end portion 80 has moved in the same direction. The pin 83 in the slot 82 moves the pivotal arm 16 in such a way that the switching wheel 14 is no longer in mesh with the play wheel 25. The detection means 40 then detect tape stoppage. Again the switching member 46 is pivoted clockwise. The switching member 46 presses against the connecting member 52 and pivots the latter again counterclockwise in the direction indicated by the arrow 67. As a result of this, the pin 65 again cooperates with the heart-shaped projection 56 and finally engages the recess 70, thereby latching the connecting member 52. The limb 71 has now moved forwards again and the head-mounting plate 74 occupies the position shown in FIG. 4 after the forward movement. Via the end portion 81 of the head-mounting plate 74 the gear wheel 17 comes into mesh with the gear wheel 11 and with the play wheel 24. In this position shown in FIG. 4 the pressure roller 78 pinches the tape (not shown) against the capstan 9 and the tape runs in the opposite direction.

The reversal of the direction of tape transport is achieved by means of the system of guide slots which is shown in various positions in FIG. 6. The last position described is the position shown in FIG. 6C. In this position the control plate 88 has been moved to the left and the guide pins 86, 87 engage the run-in branches 110 and 111. Since the head-mounting plate 74 is moved forward again, the guide pins 86, 87 are also moved forward and abut with the right-hand oblique surfaces of the pointed tongues 102 and 103. Consequently, the guide pins 86, 87 are moved to the right and move further into the branches 108 and 107. The transverse movement of the guide pins 86, 87 is possible owing to the sliding movement of the guide pins 86, 87 in the slots 84, 85. When the guide pins 86, 87 engage with the branches 107 and 108 these pins have moved the control plate 88 so far to the right that the branches 108, 98 and 107, 97 coincide. As a result of this, the tongues 102, 103 are positioned so that when the guide pins again move backwards and forwards they can abut with the left-hand oblique surfaces of the tongues 102 and 103. This position of the system of guide slots is shown in FIG. 6D. The guide pin 87 is retained in the shorter branches 107 and 97, which prevents the head-mounting plate 74 from moving further to the right. On the left-hand side the guide pin 86 can move freely in the branches 108 and 98, so that on the left-hand side of the head mounting plate 74 the spring 72 can urge the pressure roller 78 against the capstan 9. This position is shown in FIG. 4. It is to be noted that, while still maintaining the effective operation, the short branches of the slots 94, 95 and 104, 105 may be arranged (in a manner not shown) near the facing sides of the slots and the long branches near the sides which are remote from each other.

FIG. 8 shows a derived version of the guide-slot system and the control means. The guide-slot system comprises U-shaped grooves 122, 123 formed in the frame 1. The U-shaped grooves again cooperate with the guide pins 86, 87. The U-shaped grooves 122 and 123, in a similar way as in the versions shown in FIGS. 5 and 6, comprise long branches 124, 125 and short branches 126, 127. The connecting portions between the relevant branches are formed as double grooves 128a, 128b and 129a, 129b. Near these double grooves 128 and 129 there are provided guide surfaces 130, 131 and 132, 133 which serve as control means. The guide surfaces 130–133 are formed as oblique surfaces which gradually ascend from the bottom of the grooves until they terminate in the guide portions 130a, 131a, 132a and 133a. These guide portions also belong to the control means for the guide pins 86 and 87.

The guide slot systems and control means shown in FIG. 8 operate as follows. It is assumed that the head-mounting plate 74 is withdrawn relative to the cassette. In this initial position the guide pin 86 is situated in the recess 134 of the upper double groove 128b. The guide pin 87 is situated in a recess 135 of the lower double groove 129a. Above the guide pins 86 and 87 the walls of the grooves 128b and 129a are provided with guide points 136b and 137a, respectively. These guide points are offset relative to the centers of the guide pins 86, 87, to the left for the lower groove and to the right for the upper groove. Thus, if the head-mounting plate 74 is moved forward again the guide pins can only move to the left along the guide surface 130 for the upper groove and to the right along the guide surface 133 for the lower groove. This means that during this movement the guide pin 86 moves into the shorter branch 126 and the guide pin 87 into the longer branch 125. Thus, the guide pin 86 meets a stop after a short travel, while the guide pin 87 can move freely. This corresponds to the position of the head-mounting plate 74 as shown in FIG. 3. If the head-mounting plate 74 is moved back to the initial position, the guide pin 86 moves through the branch 126 into the lower groove 128a and the guide pin 87 into the upper groove 129b. In the fully withdrawn position of the head-mounting plate the guide pin 86 therefore engages a recess 138 and the guide pin 87 engages a recess 139, which is indicated by broken lines in FIG. 8. If the head-mounting plate is again moved towards the capstans the guide pin 86 moves towards the guide surface 131 in the long branch 124 as a result of the presence of a guide point 136a. The guide pin 87 moves towards the guide surface 132 in the short branch 127 owing to the presence of a guide point 137b. This means that in the present case the guide pin 87 meets a stop in the short branch 127 after a short travel, while the guide pin 86 can move freely in the branch 124. The head-mounting plate then assumes a position as shown in FIG. 4. When the head-mounting plate 84 is withdrawn again the guide pins 86 and 87 return to the initial position described above.

The advantage of this guide-slot system is that no movable parts are required for controlling the guide pin movement. The grooves, guide surfaces and guide portions can be injection-molded in the frame from a plastics.

Second Embodiment

Figure 9:
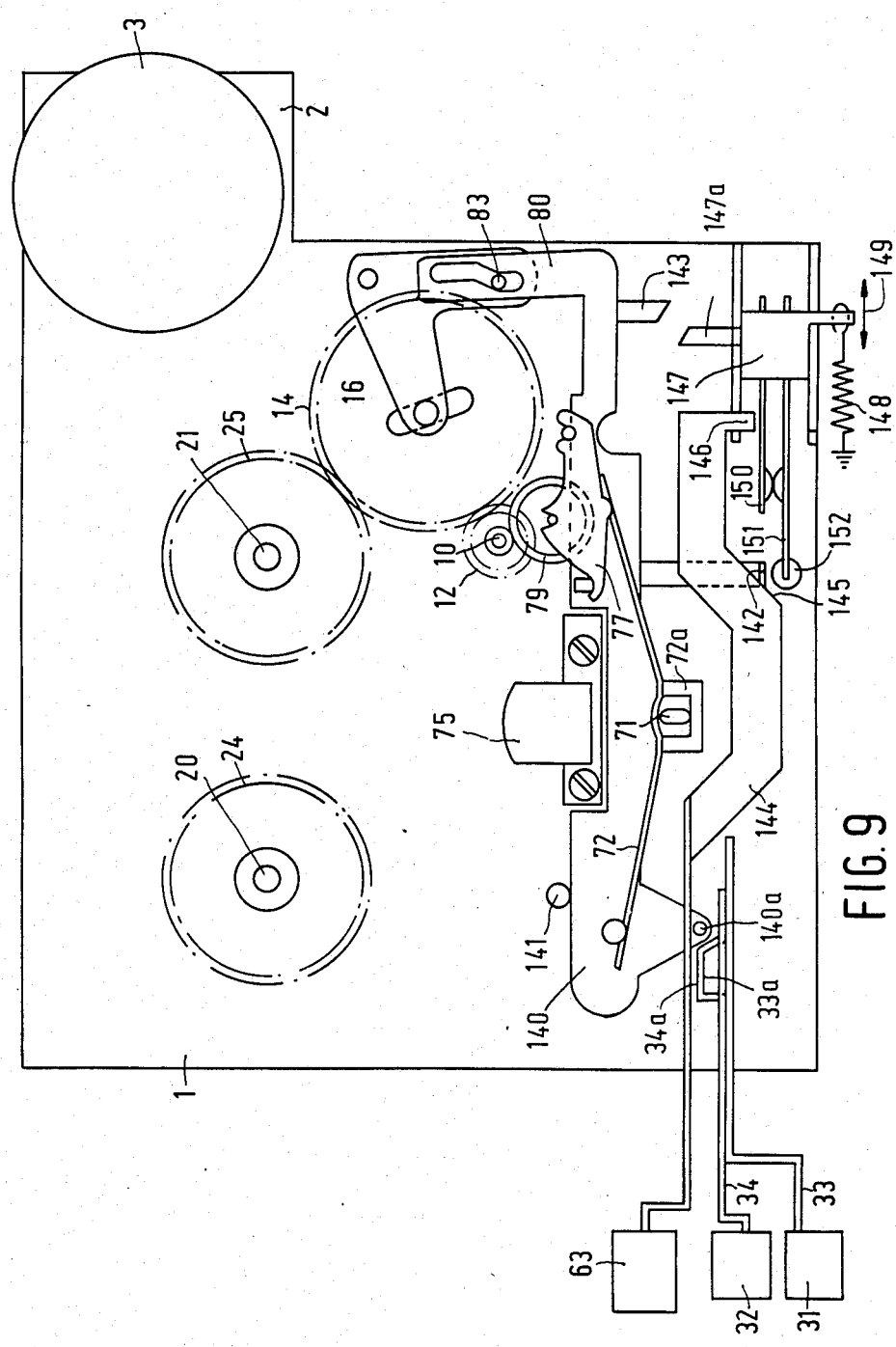
FIG. 9 shows the magnetic-head side of the magnetic-tape-cassette apparatus in a different embodiment, the apparatus being in an operating position.

FIG. 9 shows a modified embodiment of the magnetic-tape cassette apparatus with the frame 1 and the motor 3 which is secured to the frame 1 by means of a motor support. In this figure only those parts are shown which are relevent to the operation of the modified embodiment. The basic difference from the first embodiment is that a head-mounting plate 140 carries only one pressure roller 79, which cooperates with an associated capstan 10. The other pressure roller 78 and the second capstan 9 are dispensed with. In the drive mechanism the gear wheel 17 and the pivotal arm 19 carrying this gear wheel are dispensed with. Moreover, the guide-slot systems and control means for reversing the direction of tape transport are not present. Instead of the pressure roller 78, which was applied to the capstan 9, there is provided a fixed stop 141 on the chassis, with which stop the head-mounting plate 140 can abut. The head-mounting plate 140 is provided with a switching limb 142, which is directed away from the capstan 10. Moreover, the head-mounting plate 140 carries a projection 143, which is also directed away from the capstan 10 and has an oblique free end.

The stop-eject button 63 is provided with a stop-button rod 144, which comprises an oblique portion 145 and a projection 146. A switch 147 is mounted on the frame 1 so as to be movable, against the force of a spring 148, in the direction of movement of the push-button rod 144 as indicated by a double arrow 149. The spring 148 pulls the switch 147, when this switch is not loaded by another part towards the button 63 against a stop, not shown, on the frame 1. The switch carries two spring contacts 150, 151, which if no external load is applied to the switch, close the circuit of the motor 3. The switching contact 151 also carries a stud 152, which can be lifted off the switching contact 150 by the pushbutton rod 144 and the head-mounting plate 140.

During normal operation the rod 144 has moved outwards (FIG. 9). This means that the stud 152 is clear and contacts 150, 151 close the circuit of the motor 3. In this operating position the head-mounting plate 140 has been shifted towards the capstan 10 and the stop 141 by means of the connecting member 52 and its projection 71. This is, for example, the playing mode of the apparatus.

Figure 10A:
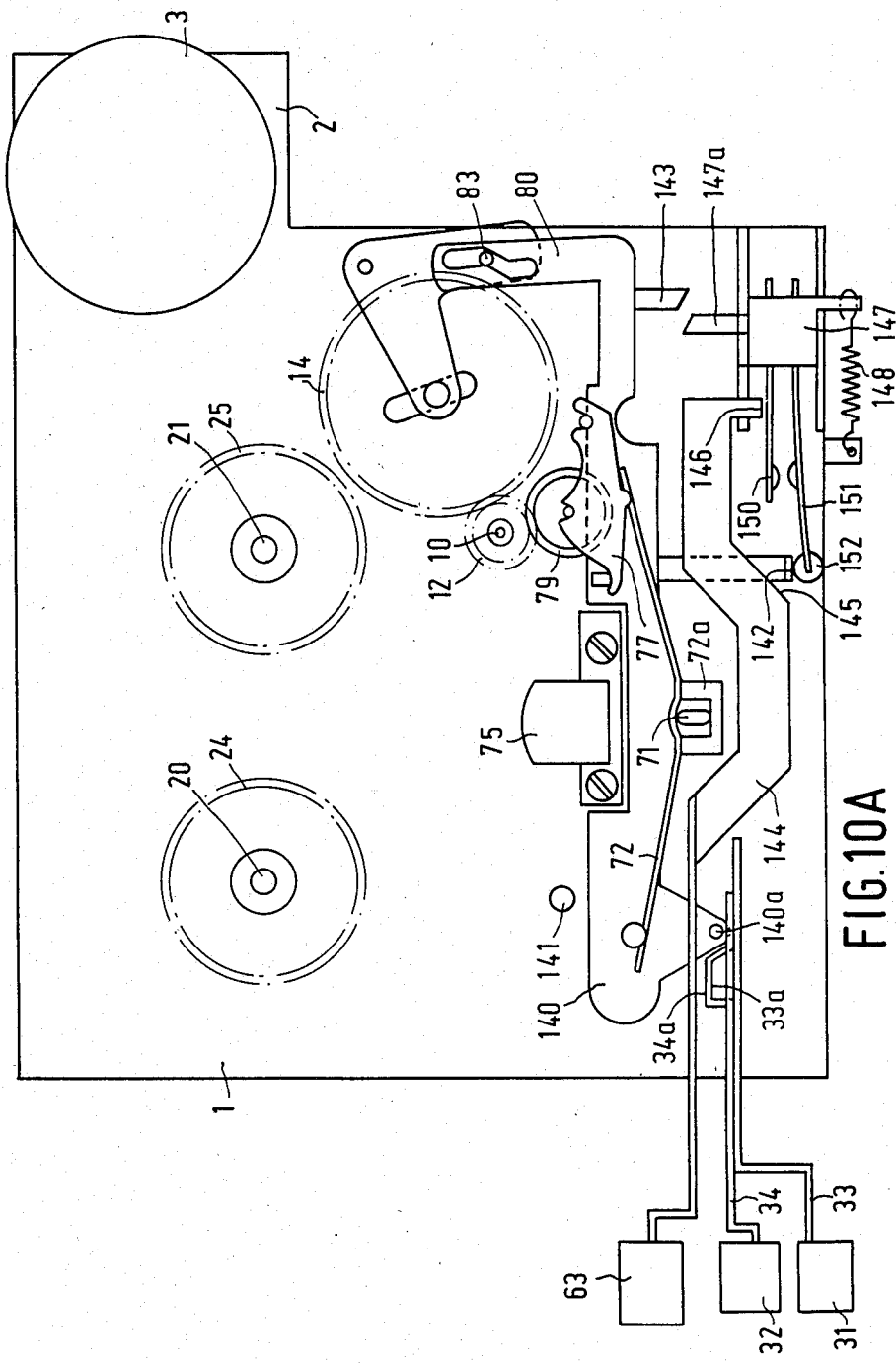
FIG. 10A shows the apparatus shown in FIG. 9 in a switched-off position.

When the end of tape is reached or when the apparatus is stopped intentionally the connecting member 52 is released and the limb 71 moves outwards. The head-mounting plate 140 is now released and the spring 54 pulls the head-mounting plate 140 outwards away from the cassette by means of the member 72a. The switching limb 142 then abuts with the stud 152 and thereby moves the contacts 150, 151 apart (see FIG. 10A). The motor circuit is thus interrupted and the drive stops. The apparatus is now inoperative.

Figure 10B:
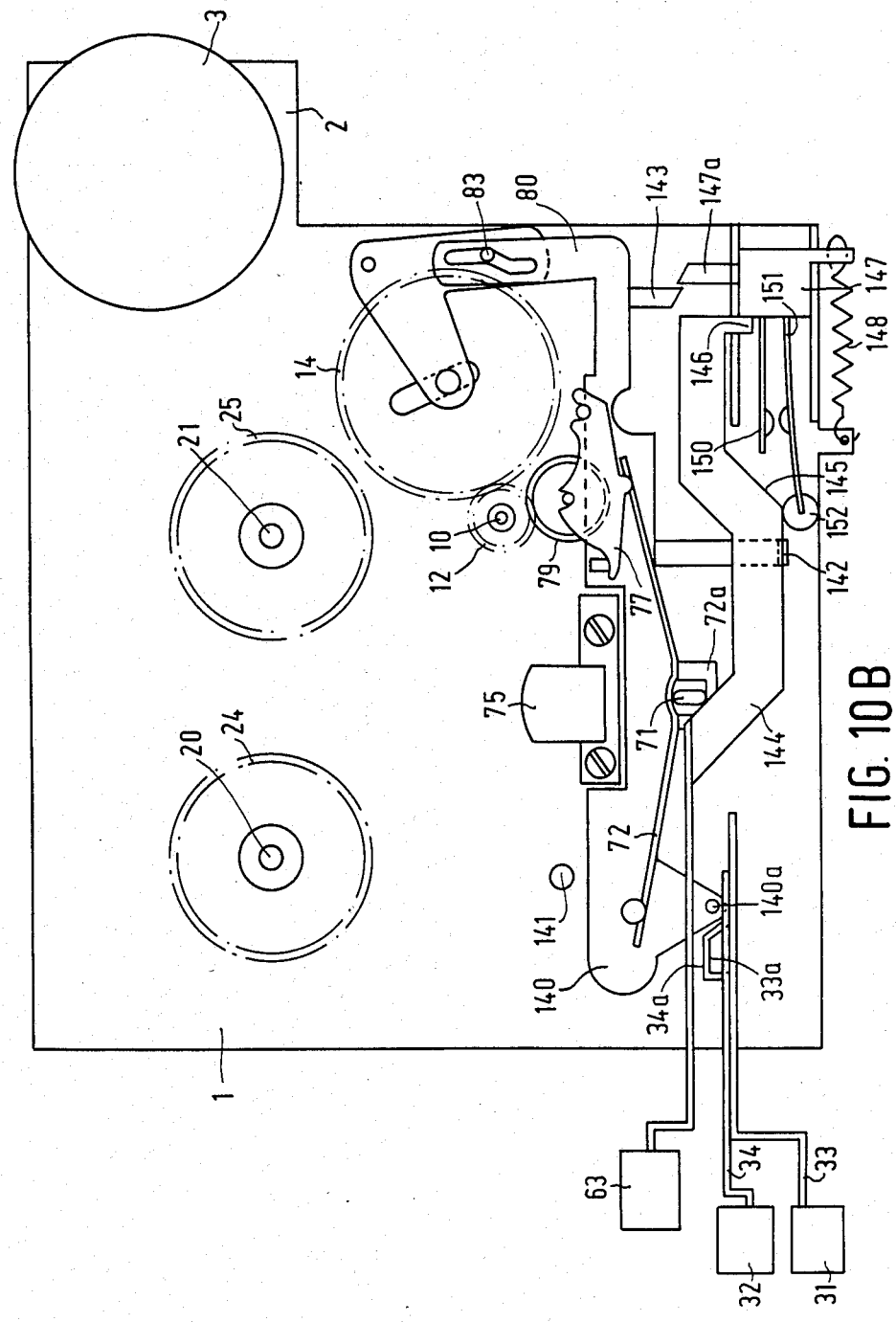
FIG. 10B shows the apparatus shown in FIG. 9 in a position in which the cassette has been removed.

If the inserted cassette just played is to be removed, the stop button 63 must be depressed. Via the rod 144 the cassette is ejected from the apparatus by means of an ejection mechanism, not shown. The stop-button rod 144 has then moved from the position shown in FIG. 10A to the position shown in FIG. 10B. This means that the projection 146 on the rod 144 acts on the switch 147 and moves this switch along its path of movement against the force of the spring 148, an oblique end portion of a projection 147a on the switch 147 sliding along the oblique end portions of the projection 143 and being latched on the left of the projection 143. The oblique portion 145 on the rod 144 takes over the function of the switching limb 142, i.e. keeping the switch 147 open, when the button 63 is depressed. The head-mounting plate then no longer influences the switching contacts 150, 151. In the shifted position the projection 147a abuts with the projection 143, even when the rod 144 is moved back when a new cassette is inserted. When the rod 144 is moved back the oblique portion 145 has disengaged the stud 152, so that the contacts 150, 151 are closed and the motor circuit is also closed. Now the switching mechanism of the apparatus is started. The connecting member 52 is moved in the direction indicated by the arrow 67 in FIG. 2B and the connecting member 52 engages the latching mechanism 57 by means of the pin 65. The head-mounting plate 140 which is now in the forward position has released the switch 147 when the projection 143 moves away, so that this switch can return to its initial position, shown in FIG. 9, under the influence of the spring 148. This ensures that the latching mechanism can function correctly during tape stoppage.

If the tape transport must be restarted from the switched-off position (FIG. 10B) without prior ejection of the cassette, this is possible by a brief depression of one of the two fastwind buttons 31, 32. For this purpose the rods 33, 34 of these push-buttons are provided with surfaces 33a, 34a which during depression act on a pin 140a on the head-mounting plate 140 and thereby move this plate forward in such a way that the switching contacts 150, 151 are closed and the switching mechanism of the apparatus is started again, the apparatus then being in the position shown in FIG. 9.

What is claimed is:

1. In a magnetic-tape-cassette apparatus having a winding spindle rotatably mounted to a frame for driving a tape reel in a cassette inserted in the apparatus, and a head mounting plate which is moveable toward the cassette, a switching mechanism for switching the apparatus from one operating function to another, comprising a switching member,
   a switching wheel having a guideway and means for driving the switching wheel continuously during operation of the apparatus, said guideway actuating said switching member during tape stoppage,
   detection means, coupled at least to said winding spindle, for controlling the engagement of the switching member with the switching wheel during tape transport, and
   a connecting member arranged to be moveable by said switching member in a given direction, for switching the apparatus to another operating function,
   characterized by comprising means for coupling the connecting member to said plate for positioning said plate,
   a latching mechanism for latching said head plate in a latched position resulting from movement of the plate towards the cassette, and
   means for releasing the latching mechanism in response to actuation of said connecting member under control of the switching member, and for moving said plate away from the cassette toward a withdrawn position.

2. A mechanism as claimed in claim 1, characterized by comprising a stop button and an actuating rod connected thereto,
   respective switching limbs provided on said actuating rod and the head mounting plate for urging contacts of the switch apart to open said circuit when the actuating rod is moved in a stop direction and also when the head-mounting plate is moved from a position near the cassette towards a withdrawn postion,
   a projection on the actuating rod for moving the switch, responsive to movement of the rod in a stop direction, toward a shifted position in which the switch contacts are inaccessible for actuation by the switching limb of the head-mounting plate, and
   a projection on the head-mounting plate which, responsive to the switch being in said shifted position and responsive to said head mounting plate being in the withdrawn position, retains the switch in the shifted position until the plate is again moved towards the cassette.

3. A mechanism as claimed in claim 2, characterized by comprising at least one fast-wind button and a fast-wind actuating rod coupled thereto, and means for coupling said fast-wind actuating rod to said switch contacts such that upon depression of the fast-wind button said contacts are closed, and said connecting member is actuated to move the head-mounting plate toward the cassette.

4. A mechanism as claimed in claim 1, characterized in that said means for coupling comprises spring means arranged to permit further movement of said connecting member in said given direction from the position of said connecting member when the plate is in said latched position, said further movement permitting said latching mechanism to release.

5. A mechanism as claimed in claim 4, characterized by comprising a stop button and an actuating rod connected thereto, respective switching limbs provided on said actuating rod and the head mounting plate for urging contacts of the switch apart to open said circuit when the actuating rod is moved in a stop direction and also when the head-mounting plate is moved from a position near the cassette towards a withdrawn position, a projection on the actuating rod for moving the switch, responsive to movement of the rod in a stop direction, toward a shifted position in which the switch contacts are inaccessible for actuation by the switching limb of the head-mounting plate, and a projection on the head-mounting plate which, responsive to the switch being in said shifted position and responsive to said head mounting plate being in the withdrawn position, retains the switch in the shifted position until the plate is again moved towards the cassette.

6. A mechanism as claimed in claim 5, characterized by comprising at least one fast-wind button and a fast-wind actuating rod coupled thereto, and means for coupling said fast-wind actuating rod to said switch contacts such that upon depression of the fast-wind button said contacts are closed, and said connecting member is actuated to move the head-mounting plate toward the cassette.

7. A mechanism as claimed in claim 4, characterized in that said latching mechanism comprises a heart-shaped projection having a recess, and a guide disposed opposite said recess, said projection and recess each being disposed on said connecting member, and a first pin, and means pivotally connecting said first pin to said frame such that the pin can be pivoted in one direction out of engagement with said projection, and can move in at least one other direction in and out of said recess and around said projection.

8. A mechanism as claimed in claim 7, characterized by comprising a stop button and an actuating rod connected thereto, respective switching limbs provided on said actuating rod and the head mounting plate for urging contacts of the switch apart to open said circuit when the actuating rod is moved in a stop direction and also when the head-mounting plate is moved from a position near the cassette towards a withdrawn position, a projection on the actuating rod for moving the switch, responsive to movement of the rod in a stop direction, toward a shifted position in which the switch contacts are inaccessible for actuation by the switching limb of the head-mounting plate, and a projection on the head-mounting plate which, responsive to the switch being in said shifted position and responsive to said head mounting plate being in the withdrawn position, retains the switch in the shifted position until the plate is again moved towards the cassette.

9. A mechanism as claimed in claim 8, characterized by comprising at least one fast-wind button and a fast-wind actuating rod coupled thereto, and means for coupling said fast-wind actuating rod to said switch contacts such that upon depression of the fast-wind button said contacts are closed, and said connecting member is actuated to move the head-mounting plate toward the cassette.

10. A mechanism as claimed in claim 7, characterized by comprising a stop button and an actuating rod connected to said button, said actuating rod having a guide slot formed therein, and a second pin carried on said latching lever, said second pin engaging said guide slot and said latching lever being pivotally connected to said frame, arranged such that movement of said actuating rod in a stop direction pivots said latching lever with respect to the frame, thereby moving said first pin out of engagement with said projection.

11. A mechanism as claimed in claim 10, characterized by comprising an electrical on/off switch for a drive motor circuit, having an actuating element mounted so as to be moveable with respect to said frame against spring force, respective switching limbs provided on said actuating rod and the head mounting plate for urging contacts of the switch apart to open said circuit when the actuating rod is moved in a stop direction and also when the head-mounting plate is moved from a position near the cassette towards a withdrawn position, a projection on the actuating rod moving the switch, responsive to movement of the rod in a stop direction, toward a shifted position in which the switch contacts are inaccessible for actuation by the switching limb of the head-mounting plate, and a projection on the head-mounting plate which, responsive to the switch being in said shifted position and responsive to said head mounting plate being in the withdrawn position, retains the switch in the shifted position until the plate is again moved towards the cassette.

12. A mechanism as claimed in claim 11, characterized by comprising at least one fast-wind button and a fast-wind actuating rod coupled thereto, and means for coupling said fast-wind actuating rod to said switch contacts such that upon depression of the fast-wind button said contacts are closed, and said connecting member is actuated to move the head-mounting plate toward the cassette.

* * * * *